(12) United States Patent
Seal (10) Patent No.: US 12,520,860 B2
(45) Date of Patent: Jan. 13, 2026

(54) INFUSION KIT AND TOOLS AND METHOD FOR USING SAME

(71) Applicant: Aron Seal, Toronto (CA)

(72) Inventor: Aron Seal, Toronto (CA)

(*) Notice: Subject to any disclaimer, the term of this patent is extended or adjusted under 35 U.S.C. 154(b) by 1 day.

(21) Appl. No.: 17/637,752

(22) PCT Filed: Aug. 6, 2020

(86) PCT No.: PCT/CA2020/051072
§ 371 (c)(1),
(2) Date: Feb. 23, 2022

(87) PCT Pub. No.: WO2021/035334
PCT Pub. Date: Mar. 4, 2021

(65) Prior Publication Data
US 2022/0279822 A1     Sep. 8, 2022

Related U.S. Application Data

(60) Provisional application No. 62/890,785, filed on Aug. 23, 2019.

(51) Int. Cl.
*A23L 5/10* (2016.01)
*A23L 27/10* (2016.01)
(Continued)

(52) U.S. Cl.
CPC ............... *A23L 5/17* (2016.08); *A23L 27/10* (2016.08); *A23L 33/105* (2016.08); *B65D 85/8043* (2013.01)

(58) Field of Classification Search
CPC .............. B65D 85/8043; B65D 85/804; B65D 85/8046; B65D 85/808; A23L 5/17;
(Continued)

(56) References Cited

U.S. PATENT DOCUMENTS 1,361,348 A * 12/1920 Pfisterer ................. A47J 36/06
D7/391
5,367,946 A * 11/1994 Yasunaga ........... A47G 19/2266
220/555

(Continued)

OTHER PUBLICATIONS

Oolong Owl. "Sous Vide Tea Precision Tea Steeping." Feb. 28, 2015. <https://oolongowl.com/sous-vide-tea-precision-tea-steeping/>. Accessed Oct. 2, 2023. (Year: 2015).*

(Continued)

*Primary Examiner* — Ericson M Lachica
(74) *Attorney, Agent, or Firm* — Brion Raffoul (57) ABSTRACT

An infusion kit and a method for using said kit for infusing a base substance with an additive substance. The additive substance is deposited into a permeable container, which is itself inserted into a non-permeable container. The base substance is then added to the non-permeable container and the non-permeable container is heated to thereby infuse the base substance with the additive substance. In one embodiment, the additive substance is roasted in the permeable container before infusion begins. In some embodiments, a non-permeable casing encloses the permeable container during roasting. In a preferred embodiment, the non-permeable container is heated by immersion in a temperature-controlled liquid bath system, such as would be found in a sous-vide or similar system. However, many other heating systems may be used. The additive substance may be derived from a plant, including but not limited to *cannabis*.

15 Claims, 8 Drawing Sheets

(51) Int. Cl.
  *A23L 33/10* (2016.01)
  *A23L 33/105* (2016.01)
  *B65D 85/80* (2006.01)
  *B65D 85/804* (2006.01)

(58) Field of Classification Search
  CPC .......... A23L 27/10; A23L 33/105; A23L 5/19; A47G 19/16
  See application file for complete search history.

(56) References Cited

U.S. PATENT DOCUMENTS

| | | | | |
|---|---|---|---|---|
| 5,632,193 | A * | 5/1997 | Shen | A47J 31/02 99/305 |
| 5,683,157 | A * | 11/1997 | Peterson | A47J 33/00 312/293.3 |
| 6,166,305 | A * | 12/2000 | Martino | A01H 5/10 800/298 |
| 6,269,736 | B1 | 8/2001 | Melton | |
| 6,276,262 | B1 | 8/2001 | Chen | |
| 7,166,822 | B1 * | 1/2007 | Chang | A47J 36/34 219/521 |
| 8,387,517 | B2 | 3/2013 | Geissler | |
| 2003/0077374 | A1 * | 4/2003 | Ohishi | A23F 3/163 426/597 |
| 2004/0184265 | A1 * | 9/2004 | Record | F21S 13/12 362/163 |
| 2005/0040051 | A1 * | 2/2005 | Martin | G09B 19/00 206/215 |
| 2005/0284303 | A1 | 12/2005 | Zell | |
| 2007/0292593 | A1 * | 12/2007 | Ganesan | A23L 5/00 426/649 |
| 2008/0272024 | A1 * | 11/2008 | Fontanesi | A45C 13/02 206/576 |
| 2009/0081333 | A1 * | 3/2009 | Chizinsky | A47G 19/16 426/79 |
| 2009/0206080 | A1 * | 8/2009 | Ribi | B65D 43/0202 220/212 |
| 2010/0018403 | A1 * | 1/2010 | Hoare | A47J 31/20 99/323 |
| 2010/0047420 | A1 * | 2/2010 | Bersten | A47J 31/18 99/279 |
| 2010/0263549 | A1 | 10/2010 | Lee | |
| 2011/0056957 | A1 * | 3/2011 | Cheng | A47J 27/04 220/573.4 |
| 2011/0155607 | A1 * | 6/2011 | Tetreault | A47J 36/064 206/459.5 |
| 2011/0168034 | A1 * | 7/2011 | Mizell | A47J 27/04 99/450 |
| 2011/0250332 | A1 * | 10/2011 | Geissler | A47J 31/20 99/322 |
| 2012/0100510 | A1 * | 4/2012 | Turvey | G06F 16/9554 434/127 |
| 2012/0132081 | A1 * | 5/2012 | Juengst | C12G 3/06 99/275 |
| 2012/0181307 | A1 * | 7/2012 | Grosser | B65D 47/06 222/478 |
| 2012/0318697 | A1 * | 12/2012 | Stern | B65D 21/0233 206/514 |
| 2013/0098920 | A1 * | 4/2013 | Lee | A47J 27/12 220/573.1 |
| 2013/0139701 | A1 * | 6/2013 | Marconi | A47J 27/21183 210/85 |
| 2013/0189412 | A1 | 7/2013 | Peasley | |
| 2013/0264333 | A1 * | 10/2013 | Alipour | A47J 36/321 219/621 |
| 2013/0337132 | A1 * | 12/2013 | Fenna | A47J 31/60 426/433 |
| 2014/0057023 | A1 * | 2/2014 | Sabga | B65D 85/816 426/77 |
| 2014/0144328 | A1 * | 5/2014 | Greene, Jr. | C12C 13/10 99/276 |
| 2014/0174965 | A1 * | 6/2014 | Herling | A47J 41/0077 206/216 |
| 2014/0251164 | A1 * | 9/2014 | Alipour | A47J 27/10 99/483 |
| 2014/0260998 | A1 * | 9/2014 | Pearson | A47J 27/10 99/330 |
| 2014/0311352 | A1 * | 10/2014 | Capitani | A47J 19/025 99/295 |
| 2014/0322418 | A1 * | 10/2014 | Cowe | A47J 27/10 426/523 |
| 2015/0024104 | A1 * | 1/2015 | Denny | A47J 36/06 426/523 |
| 2015/0027319 | A1 * | 1/2015 | Wu | A47J 27/10 99/348 |
| 2015/0175328 | A1 * | 6/2015 | Anthony | B65D 43/0208 264/299 |
| 2015/0216347 | A1 * | 8/2015 | Pisani | G05D 23/1919 99/337 |
| 2015/0329255 | A1 * | 11/2015 | Rzepecki | B65D 43/16 222/545 |
| 2016/0045053 | A1 * | 2/2016 | Cheng | B65D 25/28 220/573.1 |
| 2016/0045058 | A1 * | 2/2016 | Chuang | A47J 31/0615 99/323 |
| 2016/0051069 | A1 * | 2/2016 | Turner | A61J 11/02 222/567 |
| 2016/0051078 | A1 * | 2/2016 | Jenkins | F24C 7/08 99/341 |
| 2016/0073653 | A1 * | 3/2016 | Bell | A23L 33/19 426/583 |
| 2016/0082043 | A1 * | 3/2016 | Khan | A61K 9/1682 604/408 |
| 2016/0235799 | A1 * | 8/2016 | Qizilbash | A61K 36/31 |
| 2016/0296048 | A1 * | 10/2016 | Myoung | A47G 19/16 |
| 2016/0309944 | A1 * | 10/2016 | Masifilo | A23F 3/34 |
| 2016/0324776 | A1 | 11/2016 | Glatzel | |
| 2016/0376075 | A1 * | 12/2016 | Bacher | B65D 51/145 215/260 |
| 2017/0027365 | A1 * | 2/2017 | Mendonça Vilela Pinto Ferreira | A47J 36/321 |
| 2017/0057694 | A1 * | 3/2017 | Moore | B65D 21/0209 |
| 2017/0135383 | A1 * | 5/2017 | Liss | A47J 27/002 |
| 2017/0137187 | A1 * | 5/2017 | Anthony | B65D 43/0208 |
| 2017/0139385 | A1 * | 5/2017 | Young | A47J 27/04 |
| 2017/0143153 | A1 * | 5/2017 | Linton | A47J 27/004 |
| 2017/0172339 | A1 * | 6/2017 | De Loynes | A47G 19/16 |
| 2018/0014673 | A1 * | 1/2018 | Wert | A61J 11/04 |
| 2018/0105334 | A1 * | 4/2018 | Carver | B65D 47/2018 |
| 2018/0132656 | A1 * | 5/2018 | Graham | A47J 36/04 |
| 2018/0324908 | A1 * | 11/2018 | Denker | H04N 7/188 |
| 2019/0038078 | A1 * | 2/2019 | Hunt | A47J 43/046 |
| 2019/0084730 | A1 * | 3/2019 | Li | B65D 81/366 |
| 2019/0099035 | A1 * | 4/2019 | Trice | A47J 36/321 |
| 2019/0124722 | A1 * | 4/2019 | Young | H05B 3/44 |
| 2019/0142209 | A1 | 5/2019 | Bellman | |
| 2019/0144170 | A1 * | 5/2019 | Mouler | B65D 51/245 426/106 |
| 2019/0208946 | A1 * | 7/2019 | Eades | A47J 27/10 |
| 2019/0374066 | A1 * | 12/2019 | Backus | A47J 37/1223 |
| 2019/0394840 | A1 * | 12/2019 | Staun | H05B 6/687 |
| 2020/0045986 | A1 * | 2/2020 | Barr | B65D 77/24 |
| 2020/0154930 | A1 * | 5/2020 | Rivera | A47J 31/4457 |
| 2020/0173721 | A1 * | 6/2020 | Han | B67D 3/0022 |
| 2020/0281049 | A1 * | 9/2020 | Staun | H05B 6/6497 |
| 2020/0397177 | A1 * | 12/2020 | Walsh | A47J 43/046 |
| 2021/0088388 | A1 * | 3/2021 | Lees | G01K 13/00 |
| 2021/0214129 | A1 * | 7/2021 | Woo | B65D 33/01 |

OTHER PUBLICATIONS

"Sous Vide Egg Bites." Oct. 23, 2017. <https://pixelsandcrumbs.com/blog/2017/10/23/sous-vide-egg-bites>. Accessed Oct. 2, 2023. (Year: 2017).*

Sous Weed. "How to Make Cannabis Tea: Sponsored by Leafly." Mar. 8, 2018. <https://sousweed.com/blog/2018/2/27/how-to-make- (56) References Cited

OTHER PUBLICATIONS cannabis-tea-sponsored-by-leafly>. Accessed Oct. 2, 2023. (Year: 2018).*

Extended European Search Report for corresponding European App. No. 20856273.6, mailed Aug. 23, 2023. 9 pages.

* cited by examiner

INFUSION KIT AND TOOLS AND METHOD FOR USING SAME

CROSS REFERENCE TO RELATED APPLICATIONS

This application is a 35 U.S.C. 371 national stage filing and claims priority to International Application No. PCT/CA2020/051072 filed on Aug. 6, 2020, entitled: "INFUSION KIT AND TOOLS AND METHOD FOR USING SAME" which claims the benefit of U.S. Provisional Application No. 62/890,785 filed on Aug. 23, 2019, each of which are incorporated herein by reference in their entirety.

TECHNICAL FIELD

The present invention relates to infusion. More specifically, the present invention relates to a method and a kit of tools for infusing base substances with additive substances.

BACKGROUND

Infusions of oils and other liquids with certain additive substances have been produced for centuries. In recent years, infused products, including but not limited to cooking oils, soaps, and milks, have gained significant popularity. However, many infused products can be difficult to find commercially, particularly when the base substance and/or the additive substance, or their combination, is unusual.

Thus, many consumers seek to create their own infusions at home. This gives consumers the ability to develop their own products in line with their own preferences. For instance, they may choose to infuse a specific alcohol with an unusual herb, rather than buy something that doesn't meet their needs. Unfortunately, there are few options for home infusion. Most conventional infusion methods are complex, messy, and time-consuming, and require high levels of precision to be fully effective. Some traditional methods are even dangerous (heating oil to a specific temperature on a stovetop, for instance, can result in fire hazards). These challenges make infusion difficult outside of manufacturing environments.

As a result, numerous at-home devices have been developed to simplify the infusion process. As one example, the LEVO system allows a user to infuse oils and butters (see https://levooil.com). Although this device resolves many of the problems with traditional methods, the LEVO devices are "black box" infusion machines that limit the user's control over the process. To use a LEVO, the user adds a botanical substance (such as a dried herb) to a herb pod, and adds oil or butter to a large compartment. The user then selects a temperature and leaves the machine to work.

However, the LEVO machines cannot infuse batches larger than 16 oz. They cannot be used at temperatures above 200° F. or for more than 10 hours at one time. Additionally, they cannot be used to infuse products other than oils or butter; for instance, alcohols or milk. Further, the complexity of the LEVO system means that repairs may be difficult and costly. Other infusion devices present similar problems. Additionally, there are some substances that must be pre-heated for a fully potent infusion, and although some machines have pre-heating settings, they are typically costly. Moreover, the LEVO system and other machines are not portable and are reliant on electricity. They cannot be used with external heat sources, such as campfires or barbeques, and cannot easily travel with the user.

Thus, there is a need for methods and tools that overcome the shortcomings of the prior art by allowing a user to economically create infusions according to their preferences, using many different base substances and additive substances.

SUMMARY

The present invention provides a kit and a method for using said kit for infusing a base substance with an additive substance. The additive substance is deposited into a permeable container, which is itself inserted into a non-permeable container. The base substance is then added to the non-permeable container and the non-permeable container is heated to thereby infuse the base substance with the additive substance. In one embodiment, the additive substance is roasted in the permeable container before infusion begins. In some embodiments, a non-permeable casing encloses the permeable container during roasting. In a preferred embodiment, the non-permeable container is heated by immersion in a temperature-controlled liquid bath system, such as would be found in a sous-vide or similar system. However, many other heating systems may be used. The additive substance may be derived from a plant, including but not limited to *cannabis*.

In a first aspect, the present invention provides an infusion kit for infusing a base substance with an additive substance, said infusion kit comprising:
  a permeable container for containing said additive substance; and
  a non-permeable container for containing both said permeable container and said base substance, such that said permeable container is immersed in said base substance when said permeable container is inside said non-permeable container,
wherein both said permeable container and said non-permeable container are heat-tolerant, and
wherein said base substance is infused with said additive substance by heating said non-permeable container to a predetermined infusion temperature for a predetermined infusion time.

In a second aspect, the present invention provides an infusion kit for infusing a base substance with an additive substance, said infusion kit comprising:
  a permeable container for containing said additive substance;
  a non-permeable casing for encasing said permeable container; and
  a non-permeable container for containing both said permeable container and said base substance, such that said permeable container is immersed in said base substance when said permeable container is inside said non-permeable container;
wherein said permeable container, said non-permeable casing, and said non-permeable container are heat-tolerant,
and wherein said permeable container, encased in said non-permeable casing and containing said additive substance, is for roasting at a predetermined roast temperature for a predetermined roast time before being inserted into said non-permeable container,
and wherein said casing is removed from said permeable container before said permeable container is inserted into said non-permeable container,
and wherein, when said permeable container is inserted into said non-permeable container, said base substance is infused with said additive substance by heating said non-permeable container to a predetermined infusion temperature for a predetermined infusion time.

In a third aspect, the present invention provides a non-permeable container for infusing a base substance with an additive substance,
wherein said non-permeable container is for containing said base substance and a permeable container,
and wherein said additive substance is contained within said permeable container,
and wherein, when said permeable container is inside said non-permeable container, said permeable container is immersed in said base substance,
and wherein, when said permeable container is inserted into said non-permeable container, said base substance is infused with said additive substance by heating said non-permeable container to a predetermined infusion temperature for a predetermined infusion time.

In a fourth aspect, the present invention provides a permeable container for infusing a base substance with an additive substance,
wherein said additive substance is deposited into said permeable container, and
wherein said permeable container is inserted into a non-permeable container,
and wherein said base substance is added to said non-permeable container such that, when said permeable container is inside said non-permeable container, said permeable container is immersed in said base substance,
and wherein, when said permeable container is inserted into said non-permeable container, said base substance is infused with said additive substance by heating said non-permeable container to a predetermined infusion temperature for a predetermined infusion time.

In a fifth aspect, the present invention provides a method for infusing a base substance with an additive substance, said method comprising the steps of:
(a) depositing said additive substance into a permeable container;
(b) inserting said permeable container into a non-permeable container;
(c) adding said base substance to said non-permeable container, such that said permeable container is immersed in said base substance when said permeable container is inside said non-permeable container; and
(d) heating said non-permeable container to a predetermined infusion temperature for a predetermined infusion time, to thereby infuse said base substance with said additive substance.

In a sixth aspect, the present invention provides a method for infusing a base substance with an additive substance, said method comprising the steps of:
(a) inserting a permeable container into a non-permeable container, said permeable container containing said additive substance;
(b) adding said base substance to said non-permeable container, such that said permeable container is immersed in said base substance when said permeable container is inside said non-permeable container; and
(c) heating said non-permeable container to a predetermined infusion temperature for a predetermined infusion time, to thereby infuse said additive substance into said base substance.

BRIEF DESCRIPTION OF THE DRAWINGS

The present invention will now be described by reference to the following figures, in which identical reference numerals refer to identical elements and in which.

DETAILED DESCRIPTION

The present invention provides a kit of tools and a method that can be used for infusing a wide variety of base substances with a wide variety of additive substances, with comparatively little expense. Additionally, the tools provided in the present invention allow the user to pre-heat additive substances and to infuse base substances with those additive substances without having to remove the additive substances from the heating chamber. In some embodiments, further, disposable containers, pre-filled with additive substances, may be used.

In one embodiment of the invention, an additive substance is placed in a heat-tolerant, permeable container. The permeable container is then placed in a larger, non-permeable container, and the base substance is added to the non-permeable container so that the permeable container is immersed in/surrounded by the base substance. The non-permeable container (containing the base substance, the permeable container, and the additive substance) is then sealed and heated to a predetermined infusion temperature for a predetermined infusion time. This heating process causes the base substance to be infused with the additive substance through the permeable container. That is, as would be understood by the person skilled in the art, the base substance penetrates the permeable container, during and/or before heating, and becomes infused with the additive substance. In a preferred embodiment of the invention, the heating process is performed using a temperature-controlled liquid bath, such as would be found in a sous-vide system or an equivalent system.

Sous-vide systems and devices such as immersion circulators have grown in popularity over the past several years. In sous-vide systems, vacuum-sealed food is immersed in a liquid bath, which is then gently heated and kept at a predetermined infusion temperature for a predetermined infusion time. (The bath is typically a water bath, although other liquids can be used with some immersion circulators.) These systems offer significant and precise temperature control over without requiring substantial monitoring by the user. Such precision is valuable for effective infusions. Therefore, in a preferred embodiment of the invention, the user uses a liquid bath system as the infusion chamber to heat the non-permeable container. In one embodiment, the liquid bath system is a device that the user already owns. In another embodiment, a liquid bath system is provided as part of the infusion kit. In other embodiments of the invention, the user immerses the non-permeable container in a stand-alone temperature-controlled liquid bath, for instance on a stovetop with a thermometer. Although this approach requires more attention than a self-contained liquid bath system to ensure consistent temperature control, it can be used successfully.

It should be noted that, although a liquid bath system is preferable for even temperature control as discussed above, other heating methods may be used. For instance, the non-porous container might be placed in an oven, toaster oven, microwave, or other common heat source and heated to the infusion temperature for the infusion time. As another example, however, as the kit of the invention is portable, the kit and method might be used with a barbeque, campfire, grill, or any other suitable heating system. Additionally, note that a liquid bath system may be used in combination with many of these heat sources. For example, a liquid bath system (e.g., a pot filled with water) may be set up over a campfire and used for infusing the base substance. Again, note that using such heat sources directly may not always be as effective as using a liquid bath system with an integrated temperature control subsystem, as other heat sources may require more attention and/or may not distribute or control heat as successfully.

Additive substances for infusions are commonly derived from plants, and may include leaves, flowers, flower petals, stems, roots, beans, seeds, fruits, and any other infusible substances. In one embodiment of the invention, the additive substance comprises cannabis or is in part derived from *cannabis*. However, as would be understood, the invention is in no way limited to *cannabis*. As one example, infusions of cooking oils with herbs such as basil and rosemary, for instance, are well-known and may be performed using the present invention. Soaps, aromatic oils, and other infusions, further, are commonly made with herbs and/or other additive substances and may be used for aromatherapy. For instance, aromatic oils may be used in an oil warmer or a spray mister, to diffuse a desired scent throughout an area. Common examples of additive substances used for aromatherapy include *eucalyptus*, lavender, mint, lemon zest, and many other well-known substances.

Additionally, multiple additive substances may be used in combination. As another example, a combination of vanilla and *cannabis* might be roasted using the present invention before being used to infuse cream. Further, the additive substance does not need to be plant-based: as an example, beef bones or meat could be used as an additive substance to enrich or create a broth. Of course, herbs and other plant-derived additive substances may be used in combination with the beef bones, depending on the user's preferences. As would be clear to the person skilled in the art, any suitable additive substance or combination of substances may be used with the infusion kit and method. It should be clear that the singular 'additive substance' used herein thus encompasses all suitable additive substances and combinations thereof.

Additionally, note that the additive substance to be infused may already be present in the base substance to some degree. That is, the base substance may be a broth or other pre-infused substance that already contains some of the additive substance. Additionally, a single base substance might be infused multiple times. Repeated infusions might use new batches of the same additive substance or might use different additive substances, depending on the user's preferences.

The following figures illustrate a particular implementation of the present invention, but are not intended to limit or restrict the scope of the invention in any way. In particular, the illustrated dimensions and shapes of the various tools are flexible. Larger or smaller containers and units may be preferable for different purposes; similarly, different container shapes may be useful in different circumstances. The present invention encompasses all such variations.

Figure 1:
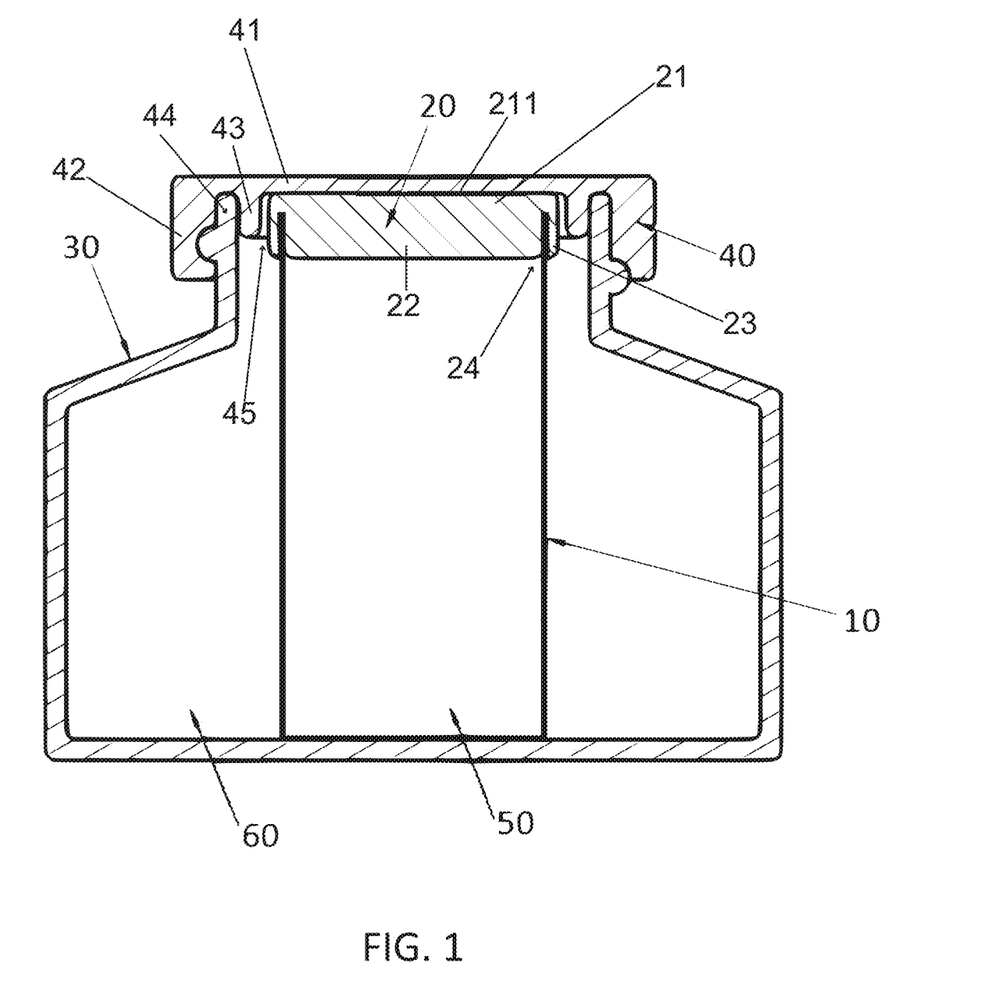
FIG. 1 is a cross-sectional diagram showing a permeable container and a non-permeable container according to one aspect of the invention.

FIG. 1 shows a cutaway view of a permeable container 10 within a non-permeable container 30, according to one embodiment of the invention. In this embodiment, the permeable container 10 is sealed by a lid 20. The permeable container 10 is situated inside the non-permeable container 30, which is itself sealed by a non-permeable-container lid 40. The additive substance would be placed inside the permeable container 10, in the space 50, and the base substance would surround the permeable container, in the space 60. The permeable container 10, containing the additive substance, is thus immersed in the base substance.

The permeable container 10 in this implementation is a hollow cylinder, open on one end, formed of perforated metal. In one embodiment, the permeable container 10 is a stainless steel cylinder having multiple perforations. In a preferable embodiment, the material used is the alloy 316 stainless steel. However, many other heat-tolerant materials are possible, including but not limited to aluminum, cast iron, copper, and silicone, and food grade plastics. It should be clear that the terms "food grade" and "food safe" include materials that are suitable for use with food or other substances intended to be consumed by humans. Further, for some purposes (e.g., soap-making), "food safe" or "food grade" container material may not be required. In such cases, the permeable container could be made of any suitably heat-tolerant, non-toxic material. Of course, the temperatures and/or time periods used in the infusion process may need to be adjusted to account for differences in container material.

Additionally, the size of the perforations on the permeable container 10 may be varied according to the intended use. For instance, in some implementations, an additive substance may be ground before being deposited into the permeable container 10. If a user intends to use the infusion kit primarily with ground additive substances, they may require a fine grating on the permeable container 10 (i.e., with many small perforations). However, if they intend to primarily use whole or large additives (for instance, whole flowers or large seeds), they may prefer a coarser grating (with fewer, larger perforations).

The lid 20 may be made of permeable or non-permeable materials, as long as the perforations are sufficiently small so as to contain the additive substance. Note however that, in some infusions, for instance some soaps, it may not be necessary to have the additive substance fully separable from the base substance. That is, after infusion, it may be acceptable or even desirable to have some of the additive substance remain in the final product, rather than just its infused essence. In such a case, the lid 20 may not need to fully seal. As shown in FIG. 1, the lid 20 in one embodiment comprises a main portion 21 that has a top planar side 211. The lid 20 also comprises a bottom extension 22 opposite the top planar side, which is sized to extend into the permeable container. The lid 20 also comprises a lip 23 extending around a perimeter of the main portion, the lip 23 being perpendicular to a plane of said top planar side 211 and being sized to fit around the opening edge of the permeable container. The lip 23 and the bottom extension 22 thus define a first recess 24 therebetween, which itself is sized to retain the opening edge of the permeable container to thereby seal the permeable container 10 with the lid 20.

In embodiments where the infusion process is performed using a liquid bath system or other immersion methods, the lid 40 preferably fully seals the non-permeable container 30. A complete seal would protect the base substance from dilution during the infusion process, i.e., from the liquid bath. That seal also ensures precise temperature control during the infusion process. However, it should be noted that an incomplete seal, though often less desirable than a full seal, may still be successful. In particular, if the non-permeable container 30 is not fully immersed in the liquid bath, the permeability of the seal may not be significant. Additionally, depending on the particular substances used, some dilution may even be desired. Further, in the embodiment shown in FIG. 1, the lid 40 for the non-permeable container comprises a lid base 41 and an outer flange 42 extending around a perimeter of said lid base 41. The outer flange 42 is perpendicular to a plane of the lid base 41. The lid 40 also comprises an inner flange 43 extending from the lid base and the inner flange 43 is likewise perpendicular to the plane of the lid base 41. The outer flange 42 and the inner flange 43 define a second recess 44 therebetween, which is sized to retain an opening edge of the non-permeable container 30. The inner flange 43 also defines a separate interior recess 45 of the lid 40 for the non-permeable container 30. As shown in FIG. 1, the lid 20 for the permeable container 30 is sized to nest within the interior recess 45 such that the entire surface area of the top planar side 211 of the lid 20 fits within the interior recess 45.

Figure 2:
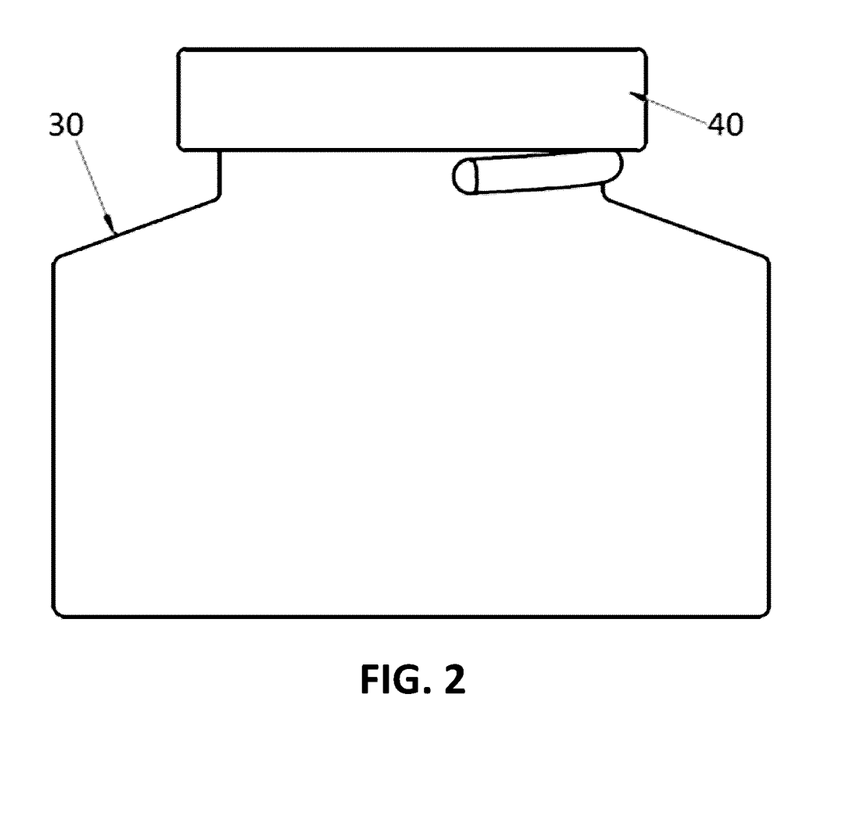
FIG. 2 is an exterior diagram of the non-permeable container of FIG. 1.

The lids 20 and 40, in this implementation, are fully removable from their respective containers 10 and 30. The lids may be removably attached to the containers by friction, or, as shown in FIG. 1 and FIG. 2, by an integrated screw-and-thread system. Other methods of attachment are of course possible, and would be known to the person skilled in the art. Further, the permeable and non-permeable containers in the invention are not required to have removable lids. There are many other possible designs that allow infusion to occur: for instance, lids might be attached to the containers by hinges. As another example, a container might have a rotatable cover, such that rotating the cover either reveals or seals a hole. As yet another example, a container might hinge in the centre. Again, many other variations would be possible.

In a preferable embodiment, the non-permeable container 30 is made of silicone. However, other materials are possible, including food-grade plastics and/or rubbers. Additionally, as noted above, for infusions where "food-grade" is not a concern, any suitable material may be used, as would be understood by the person skilled in the art. In some embodiments, the lid 40 may be made of silicone or any other suitable non-permeable material. The lid 20, as mentioned above, may be permeable or non-permeable and be made of any suitable material.

For some infusions, with some additive substances, it may be preferable to roast or pre-heat the additive substance separate from the base substance, before infusion. This helps ensure the full potency of the infusion. An example of such an additive substance is *cannabis*, which requires heating to decarboxylate and achieve its full psychoactive effect. Note, of course, that this pre-roast stage is not always required when infusing *cannabis*. Some users may prefer to infuse *cannabis* without decarboxylation/activation, preferring the flavour or the lessened effects. Note also that pre-roasted additive substances may be used: that is, rather than roasting the additive substances themselves, the user may obtain pre-roasted additive substances and make infusions with them as described above.

However, in the prior art, roasting *cannabis* and other additive substances in the prior art is messy, smelly, and/or costly, with a significant risk of wastage. The permeable, heat-tolerant container of the present invention provides a solution. Additive substances can be directly roasted in the permeable container, by heating the permeable container to a predetermined roast temperature for a predetermined roast time. The permeable container can then be placed directly in the non-permeable container 30 for infusion, without having to transfer hot and/or ground material on its own between containers. The roasting/heating process may be performed in a conventional oven or a toaster oven, or using any other suitable heat source. In one embodiment of the invention, a heating unit is provided as part of the infusion kit. In another embodiment, the user roasts/heats the additive substance in the permeable container using a heating unit they already own.

Figure 3:
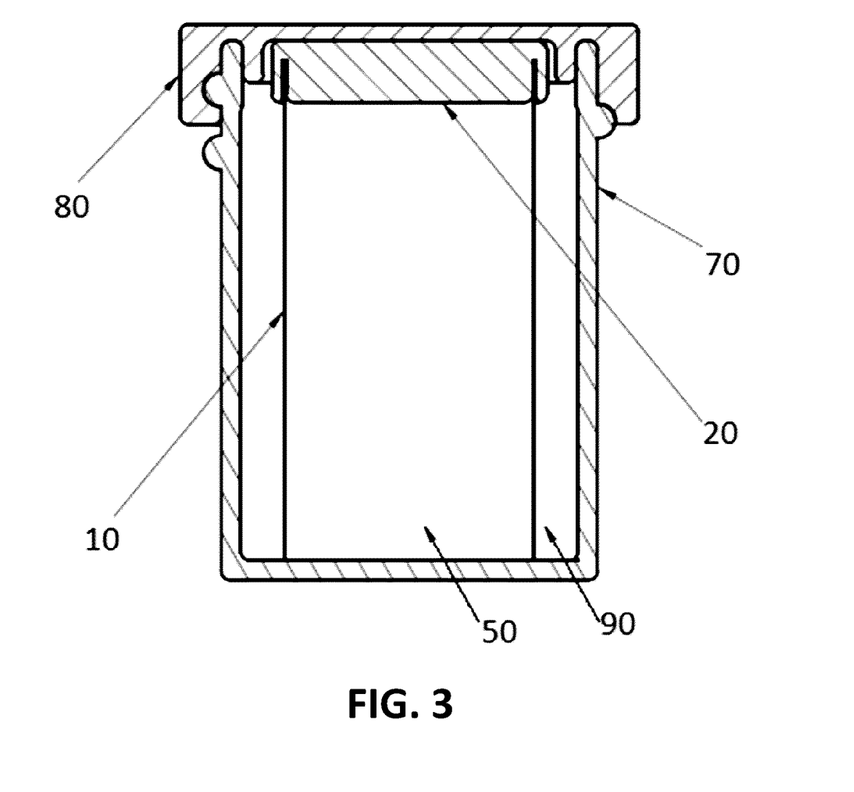
FIG. 3 is a cross-sectional diagram of the permeable container of FIG. 1 with a non-permeable casing according to another embodiment of the invention.

Some additive substances are strong-smelling, particularly during roasting. Additionally, depending on the fineness of the perforations on the permeable container, and on the fineness of the additive substance, the roasting process may result in debris in the heating unit, and/or waste. To prevent wastage of potentially costly additives and/or the introduction of lingering smells, one embodiment of the invention provides a non-permeable casing for the permeable container. Additionally, the use of such a casing may help to ensure even temperature control throughout the permeable container. Such an embodiment is illustrated in FIG. 3. As can be seen, the permeable container 10 and its lid 20 are contained within a casing 70, which is sealed by a casing lid 80. After the roasting/heating process is complete, the permeable container 10 (still sealed by its lid 20) is removed from the casing 70 and inserted into the non-permeable container for infusion, as described above. The gap 90 between the wall of the permeable container 10 and the casing 70 eases insertion and removal of the permeable container 10. However, if the gap 90 is very large, precise temperature control during roasting may be harder to achieve.

In embodiments of the invention where no purpose-built casing is provided, the non-permeable container may be used as a casing during a roasting process. Using the non-permeable container may be less practical than using a purpose-built casing, however, depending on the size of the non-permeable container. In particular, some embodiments of the non-permeable container may be too large for many conventional heating units (such as toaster ovens). Additionally, the larger air gap between the walls of the non-permeable container and the permeable container might cause difficulties in maintaining a desired temperature.

Figure 4:
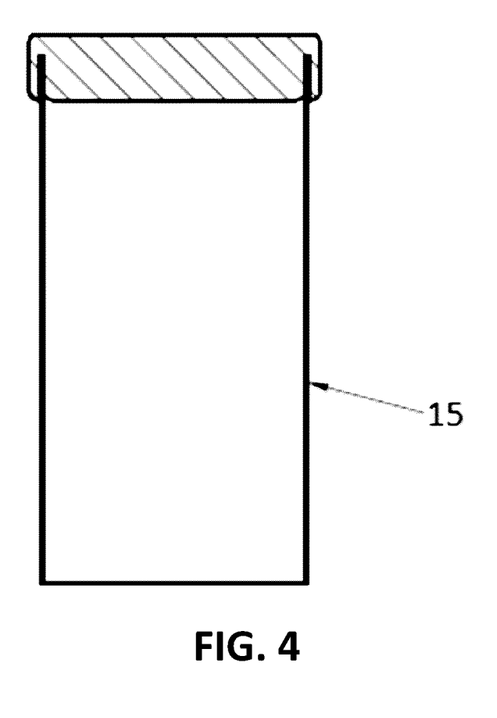
FIG. 4 is a schematic diagram showing a standalone permeable container according to one aspect of the invention.

Although the invention may be provided as a kit comprising both a non-permeable container and a permeable container, it should be noted that the tools may be provided separately. FIG. 4 is a schematic diagram showing a stand-alone permeable container 15 according to this aspect of the invention. As should be understood, in some embodiments of the invention, this container 15 may be reusable, as described above for the permeable container 10. However, in other embodiments of the invention, the permeable container 15 may be a disposable container.

Disposable permeable containers may provide the user with different sizes of container, potentially yielding different infusion strengths. Further, disposable containers may allow the user to experiment with additive substances that they do not wish to buy in bulk. In an embodiment using disposable permeable containers, the disposable permeable containers may be provided separately from the non-permeable container. Additionally, an infusion kit may be provided with a non-permeable container and one or more disposable permeable containers. In such embodiments, additive substances may be pre-ground and/or roasted before being sealed in the disposable permeable containers. The disposable permeable container may then be inserted directly into the non-permeable container. The disposable permeable containers may be made of aluminum, food-grade plastics, silicone, or any other suitable heat-tolerant material(s). It should be noted that high-cost materials are likely undesirable for disposable containers. Note also that such containers are preferably provided individually sealed, to reduce potential wastage and/or spoilage of the additive substance.

In a further embodiment of the invention, the permeable container may be used without the non-permeable container. For instance, the permeable container, containing the additive substance, may be placed directly in a broth or soup which is then heated. For such a purpose, the permeable container may be roasted, with or without a non-porous casing, before being placed in the broth. As a further example, an additive substance in the permeable container may be used to add flavour to a gravy or a sauce.

As would be understood by the person skilled in the art, there are many possible ranges of temperatures and times that may be used in both infusion processes and roasting/heating processes, where relevant. The appropriate temperatures and times of course depend on the specific additive and base substances used and on the desired strength of the resulting infusion. In addition, there is currently significant debate around the best temperatures and time periods for roasting and infusing *cannabis*. In a preferred embodiment, *cannabis* is roasted at 240° F. for 60 minutes, and then a base substance is infused with the *cannabis* by heating to 165° F. for one to 24 hours, depending on desired infusion strength. Again, however, many different temperatures and times may be used, according to the user's preferences.

Note also that degree of heat-tolerance desired for the permeable container, the non-permeable container, and the non-permeable casing (and, if applicable, their respective lids) may depend on the specific uses intended. For instance, some users may wish to perform only comparatively low-heat infusions, while others may desire a high-heat roasting stage, or comparatively higher-heat infusion steps. In the first case, with comparatively low-heat infusions, the various elements of the invention may be made from a material with a comparatively low heat tolerance. However, if high-heat roasting is to be performed, a material with a comparatively higher heat tolerance may be desired. In a preferable embodiment, the various elements of the inventions are made of material(s) that is/are tolerant of a range of temperatures.

Figure 5:
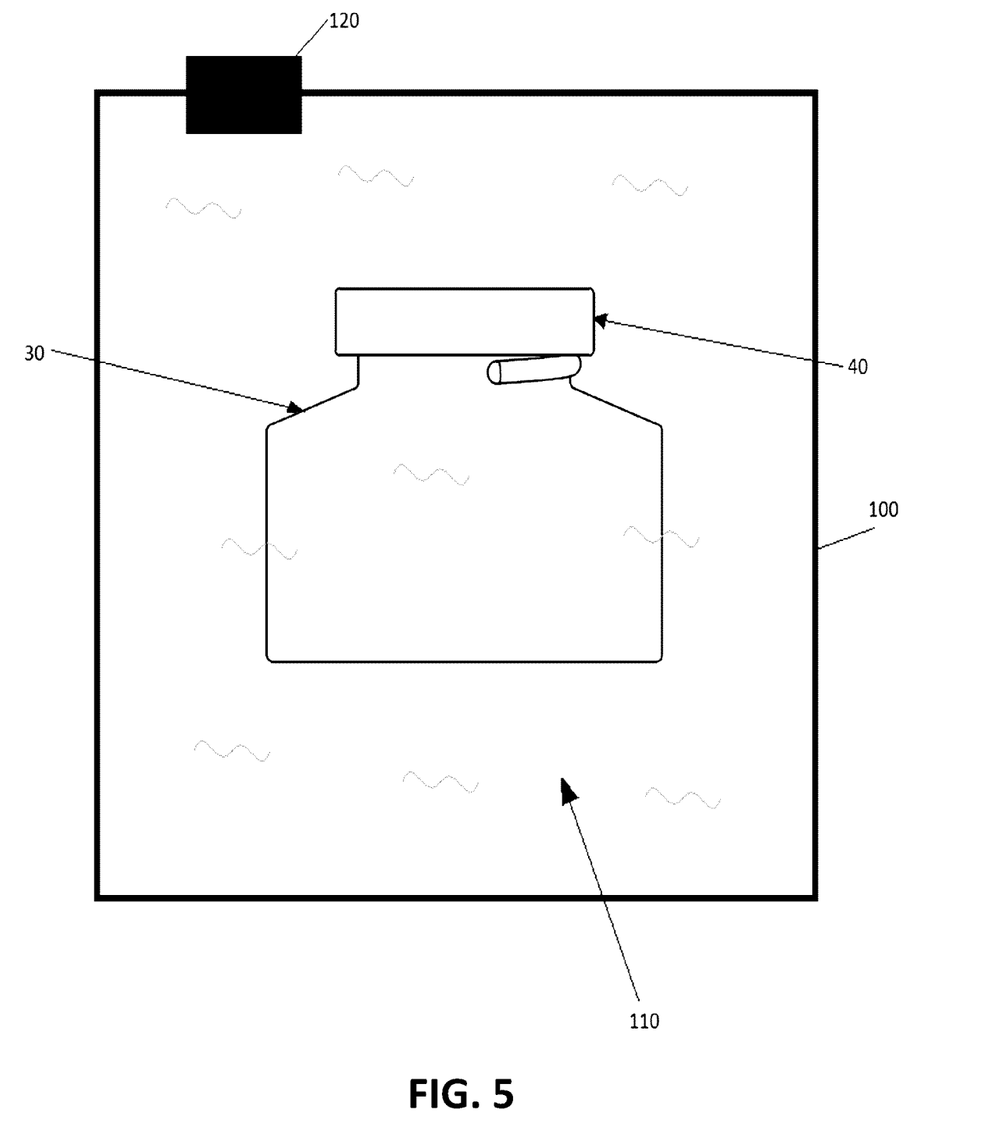
FIG. 5 is a schematic diagram showing the non-permeable container of FIG. 1 in a liquid bath system according to one embodiment of the invention.

FIG. 5 is a schematic diagram showing the non-permeable container 30, sealed by its lid 40, immersed in a liquid bath system as described above. The bath 100 contains a liquid 110, which is typically though not necessarily water. As can be seen, the non-permeable container 30 and lid 40 are entirely immersed in the liquid 110. Full immersion, as compared to incomplete immersion, provides more even temperature control and is therefore preferable. However, for some infusions, incomplete immersion of the non-permeable container 30 may be sufficient. Of course, as would be understood, the dimensions of the bath 100 and the relative dimensions of the bath 100 and the non-permeable container 30 may vary.

The liquid 110 is heated to the predetermined infusion temperature by a temperature control subsystem 120. As would be understood, many variations of the temperature control subsystem 120 are encompassed by the invention. For instance, in some liquid bath systems, the temperature control subsystem 120 may be integrated into the walls of the bath 100. In other systems, the temperature control subsystem 120 may comprise a heat source, such as a stovetop burner, and a temperature monitoring device, such as a cooking thermometer.

Figure 6:
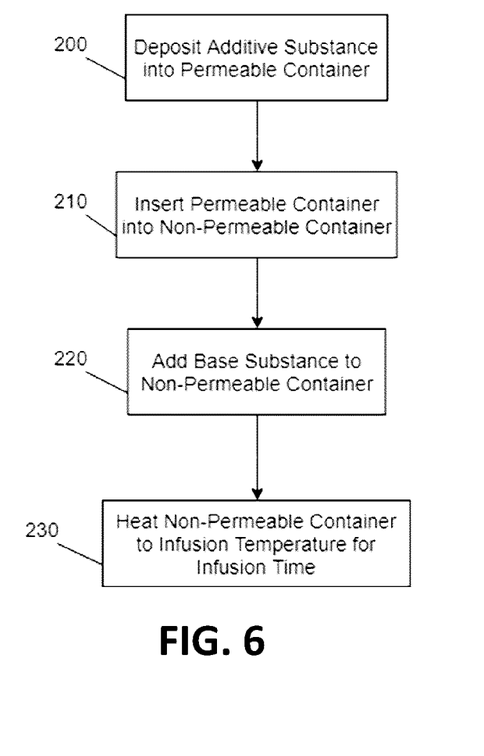
FIG. 6 is a flowchart detailing a method according to one aspect of the invention.

Referring now to FIG. 6, a flowchart illustrating a method according to one embodiment of the invention is shown. At step 200, an additive substance is deposited into a permeable container. The permeable container is then inserted into a non-permeable container at step 210. A base substance is added to the non-permeable container, around the permeable container (step 220), and the non-permeable container is then heated to a predetermined infusion temperature for a predetermined infusion time at step 230. As discussed above, this infusion process preferably occurs using a liquid bath system.

Figure 7:
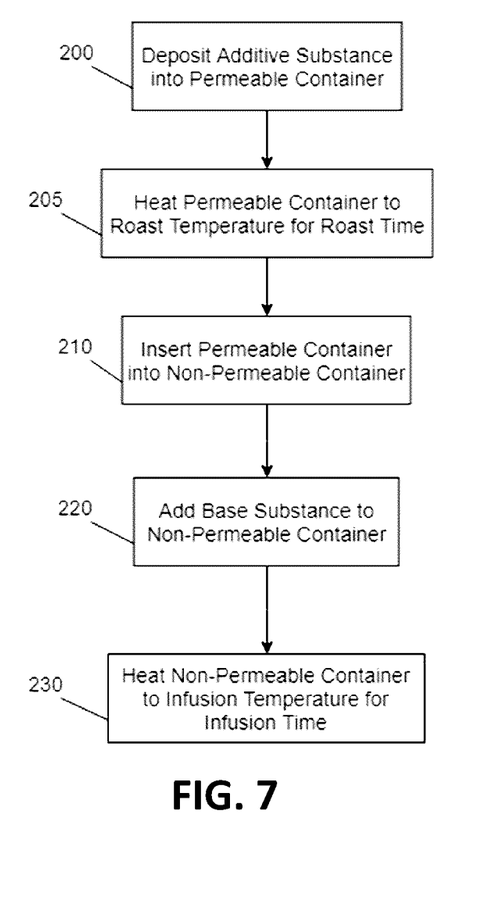
FIG. 7 is another flowchart, detailing a method according to an embodiment of the invention.

FIG. 7 is a flowchart illustrating a method according to another embodiment of the invention. This embodiment is very similar to the embodiment shown in FIG. 4, except that the permeable container, containing the additive substance, is roasted at step 205, before being inserted into the non-permeable container at step 210. The many variations of this roasting/heating process have been detailed above.

Figure 8:
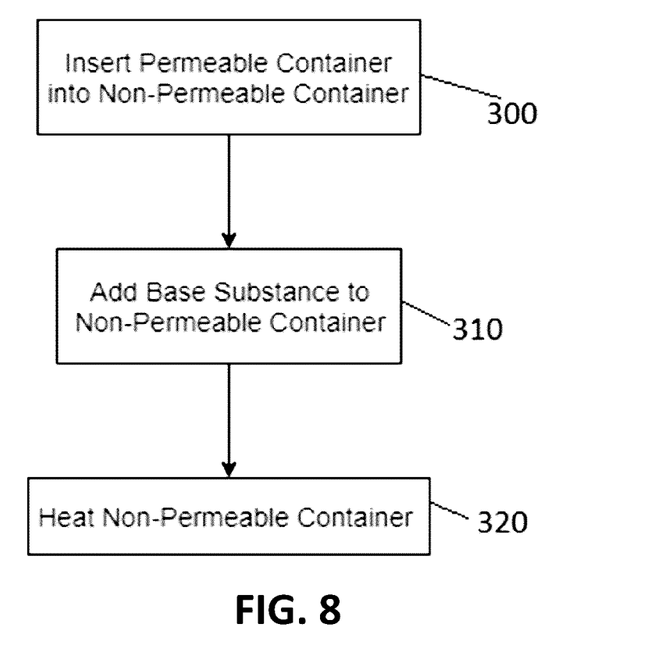
FIG. 8 is a flowchart detailing a method according to another aspect of the invention.

Referring now to FIG. 8, a flowchart detailing a method according to another aspect of the invention is shown. In this embodiment of the invention, a permeable container, pre-filled with additive substance(s), is inserted into a non-permeable container at step 300. At step 310, a base substance is added to the non-permeable container, surrounding the permeable container as described above. The non-permeable container is then heated to a predetermined infusion temperature for a predetermined infusion time at step 320.

A person understanding this invention may now conceive of alternative structures and embodiments or variations of the above all of which are intended to fall within the scope of the invention as defined in the claims that follow.

What is claimed is:

1. A system comprising:
    a permeable container configured to contain an additive substance, said permeable container having a first lid portion configured to seal an opening of said permeable container, said first lid portion comprising a main portion having a top planar side and a bottom extension opposite said top planar side, wherein said bottom extension is sized to extend into said permeable container, and said first lid portion having a lip extending around a perimeter of said main portion, said lip being perpendicular to a plane of said top planar side, wherein said lip is sized to fit around an opening edge of said permeable container, and wherein said lip and said bottom extension define a first recess therebetween, said first recess being sized to retain said opening edge of said permeable container;
    a non-permeable container configured to contain both said permeable container and a base substance, wherein, when said permeable container is inside said nonpermeable container, a space is formed between an outer wall of said permeable container and an inner wall of said non-permeable container, and wherein said permeable container is immersed in said base substance when said permeable container is inside said nonpermeable container; and a non-permeable lid portion configured to seal an opening of said non-permeable container, said non-permeable lid portion comprising a lid base, an outer flange extending around a perimeter of said lid base, said outer flange being perpendicular to a plane of said lid base, and an inner flange extending from the lid base, said outer flange and said inner flange defining a second recess therebetween, said second recess sized to retain an edge of said opening of said non-permeable container, and said inner flange defining an interior recess of said non-permeable lid portion, wherein said first lid portion is sized to nest within said interior recess such that an entire surface area of said top planar side of said first lid portion fits within said interior recess, wherein said non-permeable lid portion and said non-permeable container are made of silicone, wherein a seal formed by said non-permeable lid portion with said non-permeable container is air-tight and water-tight, wherein said permeable container, said non-permeable container, and said non-permeable lid portion are heat-tolerant, wherein said base substance is infused with said additive substance by heating said non-permeable container to a predetermined infusion temperature for a predetermined infusion time, wherein said permeable container, said non-permeable container, and said non-permeable lid portion form an infusion kit for infusing said base substance with said additive substance, wherein said first lid portion is configured to cooperate with and nest within said non-permeable lid portion, and wherein said non-permeable container and said non-permeable lid portion are configured to be immersed in a heated liquid bath.

2. The system according to claim 1, wherein said additive substance is derived from a plant.

3. The system according to claim 2, wherein said additive substance comprises cannabis.

4. The system according to claim 1, further comprising a heat-tolerant casing separate from said non-permeable container, said heat-tolerant casing being configured to removably fit around said permeable container, wherein, when said heat-tolerant casing is fitted around said permeable container, a gap is formed between said outer wall of said permeable container and an inner wall of said heat-tolerant casing, said gap being of a size sufficient to permit insertion and removal of said permeable container from said heat-tolerant casing and to permit a desired temperature control during a roasting process and wherein said heat-tolerant casing is non-permeable.

5. The system according to claim 1, wherein a liquid bath device for providing said heated liquid bath is supplied as part of said infusion kit.

6. The system according to claim 1, further comprising a heating unit for roasting said additive substance while said additive substance is within said permeable container.

7. The system according to claim 1, wherein said permeable container is a metal container having multiple perforations.

8. The system according to claim 1, wherein said permeable container comprises at least one of: stainless steel, cast iron, copper, aluminum, and silicone.

9. The system according to claim 1, wherein said same material of said non-permeable container and said non-permeable lid portion comprises at least one of: silicone, rubber, and plastic.

10. The system according to claim 1, wherein said base substance comprises at least one of: an oil, a milk, an alcohol, an oil-based substance, and a water-based substance.

11. The system according to claim 1, wherein said additive substance is a ground substance having a predetermined fineness.

12. The system according to claim 1, wherein said permeable container is pre-filled with said additive substance and wherein said permeable container is disposable.

13. The system according to claim 1, wherein said permeable container comprises a container portion and a permeable-container lid portion, wherein said container portion is a hollow cylinder open at one end, and wherein said permeable-container lid portion fits over said one end of said hollow cylinder.

14. The system according to claim 1, wherein said non-permeable container comprises silicone and said non-permeable lid portion comprises silicone.

15. A system comprising:

a permeable container configured to contain an additive substance, said permeable container having a first lid portion configured to seal an opening of said permeable container, said first lid portion comprising a main portion having a top planar side and a bottom extension opposite said top planar side, wherein said bottom extension is sized to extend into said permeable container, and said first lid portion having a lip extending around a perimeter of said main portion, said lip being perpendicular to a plane of said top planar side, wherein said lip is sized to fit around an opening edge of said permeable container, and wherein said lip and said bottom extension define a first recess therebetween, said first recess being sized to retain said opening edge of said permeable container;

a non-permeable container configured to contain both said permeable container and a base substance, wherein, when said permeable container is inside said nonpermeable container, a space is formed between an outer wall of said permeable container and an inner wall of said non-permeable container, and wherein said permeable container is immersed in said base substance when said permeable container is inside said nonpermeable container;

a heat-tolerant casing separate from the non-permeable container, said heat-tolerant casing being configured to removably fit around said permeable container, wherein, when said heat-tolerant casing is fitted around said permeable container, a gap is formed between said outer wall of said permeable container and an inner wall of said heat-tolerant casing, said gap being of a size sufficient to permit insertion and removal of said permeable container from said heat-tolerant casing and to permit a desired temperature control during a roasting process, and wherein said heat-tolerant casing is non-permeable; and a non-permeable lid portion configured to seal an opening of said non-permeable container, said non-permeable lid portion comprising a lid base, an outer flange extending around a perimeter of said lid base, said outer flange being perpendicular to a plane of said lid base, and an inner flange extending from the lid base, said outer flange and said inner flange defining a second recess therebetween, said second recess sized to retain an edge of said opening of said non-permeable container, and said inner flange defining an interior recess of said non-permeable lid portion, wherein said first lid portion is sized to nest within said interior recess such that an entire surface area of said top planar side of said first lid portion fits within said interior recess, wherein said non-permeable lid portion and said non-permeable container are made of silicone, wherein a seal formed by said non-permeable lid portion with said non-permeable container is air-tight and water-tight, wherein said permeable container, said non-permeable container, and said non-permeable lid portion are heat-tolerant, wherein said base substance is infused with said additive substance by heating said non-permeable container to a predetermined infusion temperature for a predetermined infusion time, wherein said permeable container, said non-permeable container, and said non-permeable lid portion form an infusion kit for infusing said base substance with said additive substance, wherein said first lid portion is configured to cooperate with and nest within said non-permeable lid portion, and wherein said non-permeable container and said non-permeable lid portion are configured to be immersed in a heated liquid bath.

* * * * *